US010168990B1

(12) United States Patent
Annamalai et al.

(10) Patent No.: US 10,168,990 B1
(45) Date of Patent: Jan. 1, 2019

(54) AUTOMATIC REPLACEMENT OF A FLOATING-POINT FUNCTION TO FACILITATE FIXED-POINT PROGRAM CODE GENERATION

(71) Applicant: The MathWorks, Inc., Natick, MA (US)

(72) Inventors: Muthiah Annamalai, Boston, MA (US); Kiran K. Kintali, Ashland, MA (US); Srinivas Muddana, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 610 days.

(21) Appl. No.: 14/157,821

(22) Filed: Jan. 17, 2014

(51) Int. Cl.
*G06F 1/03* (2006.01)
*G06F 8/40* (2018.01)
*G06F 8/41* (2018.01)
*G06F 7/483* (2006.01)

(52) U.S. Cl.
CPC ............ *G06F 7/483* (2013.01); *G06F 1/03* (2013.01); *G06F 8/40* (2013.01); *G06F 8/447* (2013.01)

(58) Field of Classification Search
CPC .......... G06F 8/40; G06F 8/443; G06F 8/4434; G06F 8/4441; G06F 8/447; G06F 8/52; G06F 1/03; G06F 1/0307
See application file for complete search history.

(56) References Cited

U.S. PATENT DOCUMENTS

| 5,528,741 | A | * | 6/1996 | Lucas | .............. | H03M 7/24 |
| | | | | | | 345/593 |
| 6,460,177 | B1 | * | 10/2002 | Lee | .............. | G06F 8/437 |
| | | | | | | 717/146 |
| 9,436,442 | B1 | * | 9/2016 | Kintali | .............. | H03M 7/24 |

(Continued)

OTHER PUBLICATIONS

P. Banerjee, D. Bagchi, M. Haldar, A. Nayak, V. Kim and R. Uribe, "Automatic Conversion of Floating Point MATLAB Programs into Fixed Point FPGA Based Hardware Design", Proc. FPGA Based Custom Computing Machines (FCCM), 2003.*

(Continued)

*Primary Examiner* — Matthew D Sandifer
(74) *Attorney, Agent, or Firm* — Harrity & Harrity, LLP

(57) ABSTRACT

A device may receive a floating-point function. The floating-point function may be a function described in a programming language that uses floating-point representation. The device may determine that fixed-point program code, associated with the floating-point function, is to be generated. The device may determine that the floating-point function is to be replaced with a replacement construct before the fixed-point program code is generated. The replacement construct may be described in the programming language and may be capable of conversion from the floating-point representation to a fixed-point representation. The device may determine parameters associated with generating the replacement construct. The parameters may be determined based on an evaluation of the floating-point function. The device may generate the replacement construct based on the parameters. The device may replace the floating-point function with the replacement construct. The device may generate the fixed-point program code based on the replacement construct.

20 Claims, 16 Drawing Sheets

(56) References Cited

U.S. PATENT DOCUMENTS

2004/0215676 A1* 10/2004 Tang .................. G06F 7/483
708/204
2008/0040409 A1* 2/2008 Matsuzaki .............. G06F 8/443
708/204
2014/0059524 A1* 2/2014 Kee ..................... G06F 8/34
717/154

OTHER PUBLICATIONS

P. Belanovic and M. Rupp, "Automated floating-point to fixed-point conversion with the fixify environment", Proc. 16th IEEE Int. Workshop RSP, pp. 172-178, 2005.*

C. C. Wang, C. Shi, R. W. Brodersen and D. Marković, "An automated fixed-point optimization tool in MATLAB XSG/SynDSP environment", ISRN Signal Process., 2011.*

M. Ristovic, S. Lubura and D. Jokic, "Implementation of CORDIC algorithm on FPGA altera cyclone", 20th Telecommunications Forum (TELFOR), pp. 875-878, Nov. 2012.*

MathWorks, "Optimized fixed-point approximation of nonlinear function by interpolating lookup table data points", http://www.mathworks.com/help/simulink/slref/fixpt_look1_func_approx.html, Sep. 4, 2009, 3 pages.

MathWorks, "Use Lookup Table Approximation Functions", http://www.mathworks.com/help/fixedpoint/ug/summary-for-using-lookup-table-approximation-functions.html, Feb. 1, 2002, 2 pages.

MathWorks, "Worst-Case Error for a Lookup Table", http://www.mathworks.com/help/fixedpoint/ug/worst-case-error-for-a-lookup-table.html, Feb. 1, 2002, 2 pages.

MathWorks, "Create Lookup Tables for a Sine Function", http://www.mathworks.com/help/fixedpoint/ug/creating-lookup-tables-for-a-sine-function.html, Feb. 1, 2002, 12 pages.

* cited by examiner

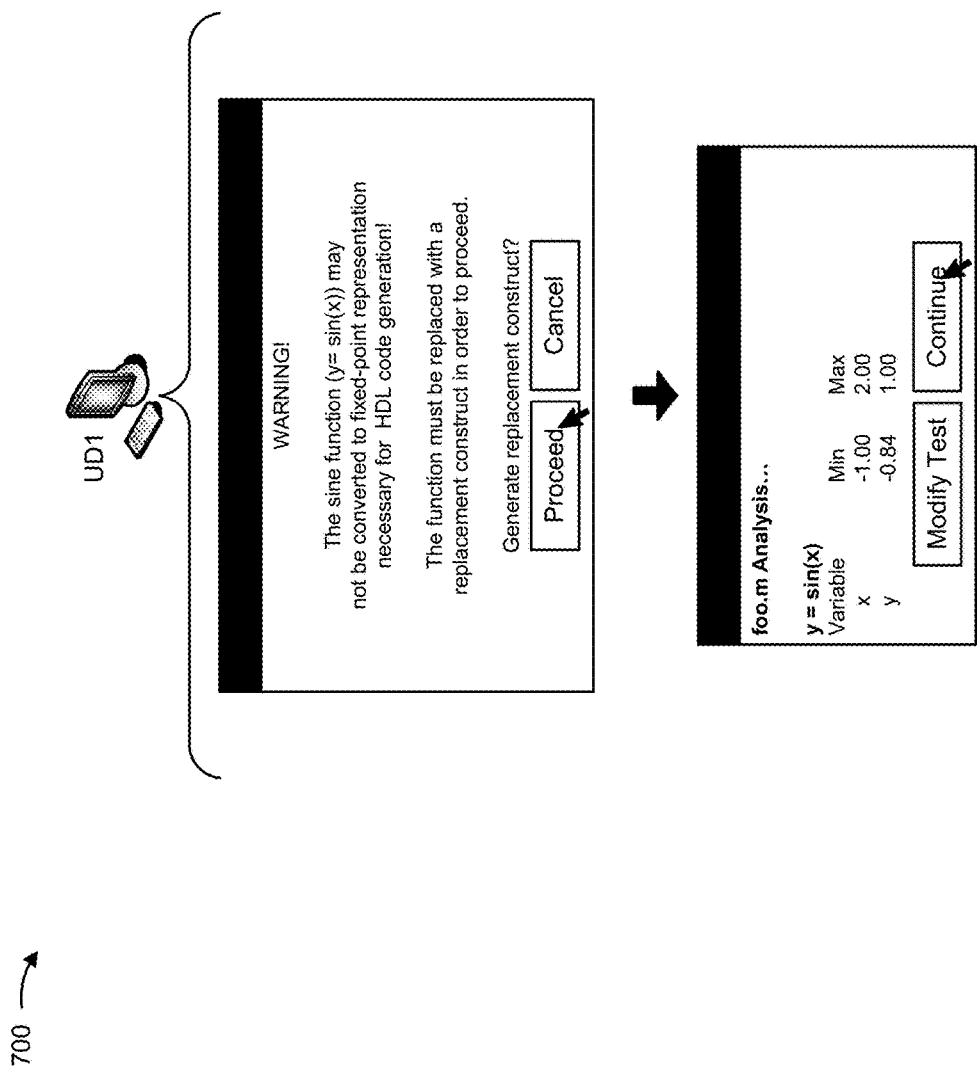

AUTOMATIC REPLACEMENT OF A FLOATING-POINT FUNCTION TO FACILITATE FIXED-POINT PROGRAM CODE GENERATION

BRIEF DESCRIPTION OF THE DRAWINGS

FIGS. 7A-7D are diagrams of example implementation relating to the example process shown in FIG. 4;

FIGS. 8A-8C are diagrams of an example graphical user interface implementation relating to the example process shown in FIG. 4; and FIGS. 9A and 9B are diagrams of an example command line interface implementation relating to the example process shown in FIG. 4.

DETAILED DESCRIPTION

The following detailed description of example implementations refers to the accompanying drawings. The same reference numbers in different drawings may identify the same or similar elements.

A user may provide, via input to a technical computing environment (TCE) hosted by a user device, information associated with a function. For example, the user may provide information associated with evaluating a mathematical function (e.g., a trigonometric function, a cosine function, a power function, a polynomial function, etc.) based on one or more inputs. In some cases, the user may provide the function in a first programming language (e.g., a MATLAB® language, a MATLAB-compatible language, a MATLAB-like language, etc.) that represents values, associated with the function, using a floating-point representation (described herein as a floating-point function). Further, the user may wish to generate program code, associated with the floating-point function, using a second programming language that represents values using a fixed-point representation (described herein as fixed-point program code). For example, the user may provide information associated with a floating-point function using MATLAB programming language, and may wish to generate fixed-point program code, based on the floating-point function, that is described in a hardware description language (HDL) programming language.

However, the TCE may not be configured to generate the fixed-point program code associated with the floating-point function. As such, the floating-point function must be replaced with a replacement construct (e.g., a construct that represents the floating-point function) that may be difficult for a user to manually generate. Implementations described herein may allow a user device to generate a replacement construct based on a floating-point function. The user device may generate fixed-point program code associated with the floating-point function using on the replacement construct (e.g., rather than using the floating-point function).

Figure 1A:
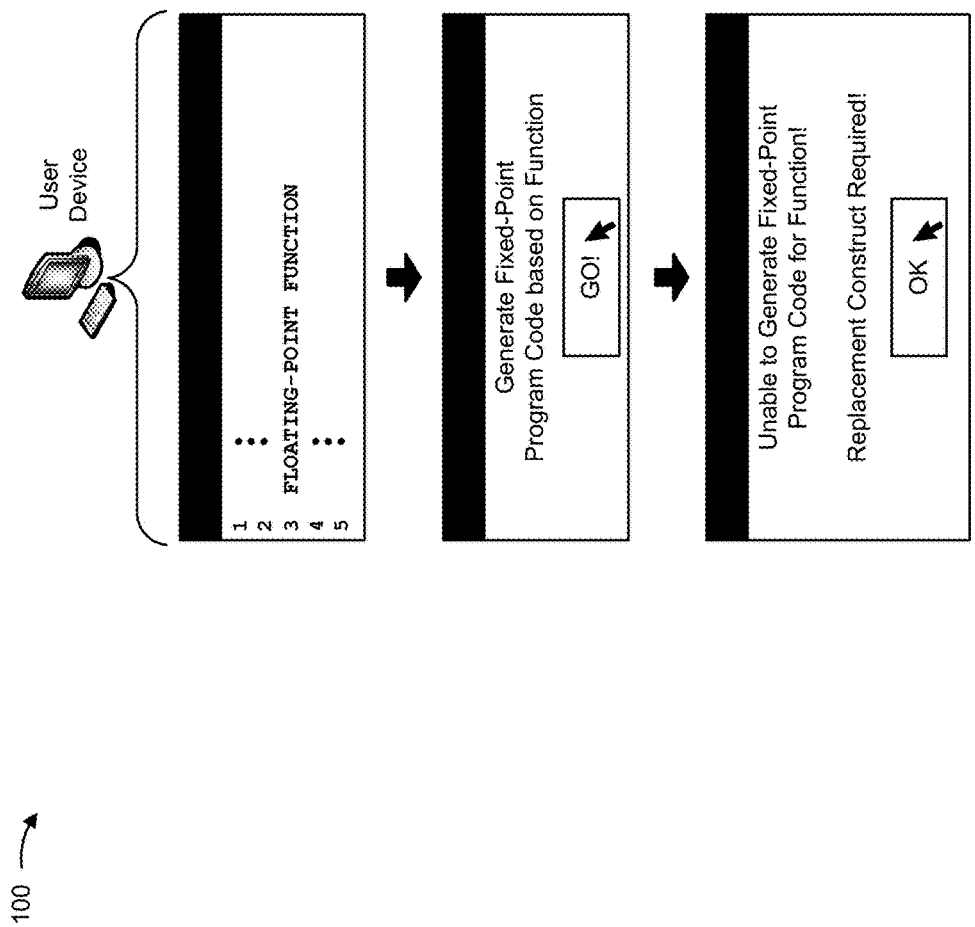
FIGS. 1A and 1B are diagrams of an overview of an example implementation described herein.
Figure 1B:
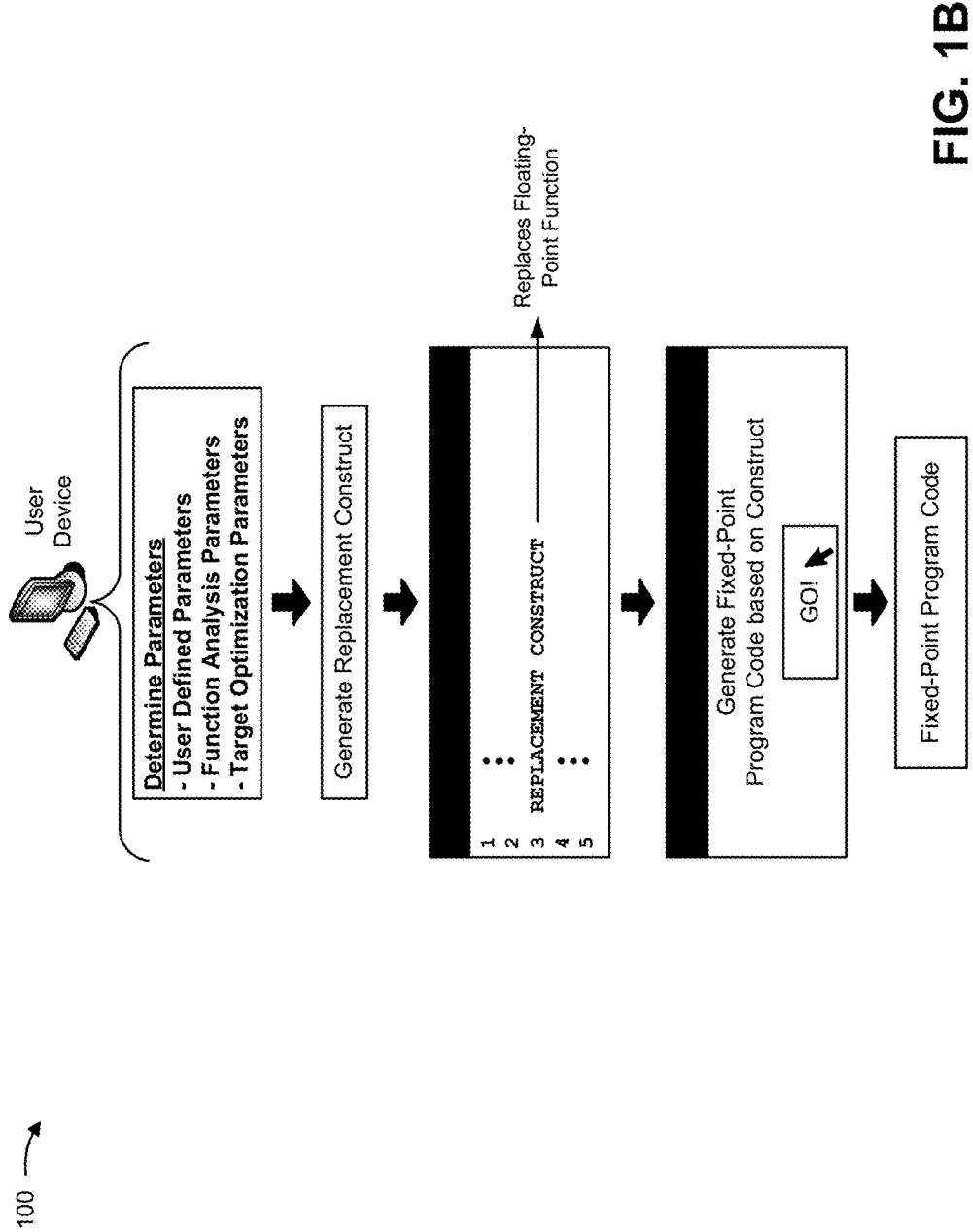

FIGS. 1A and 1B are diagrams of an overview of an example implementation 100 described herein. For the purposes of example implementation 100, assume that a user of a user device has provided, via a TCE hosted by the user device, information associated with a floating-point function. Further, assume that the user wishes to generate fixed-point program code based on the floating-point function.

As shown in FIG. 1A, the user may provide, via a command line interface associated with the user device, information associated with the floating-point function. If desired, the user may further provide information associated with additional commands, additional functions, etc. As further shown, the user may indicate, via input provided to a user interface associated with the user device, that the user wishes to generate fixed-point program code based on the floating-point function. However, as shown, the user device may determine that the TCE is unable to generate fixed-point program code associated with the floating-point function and may indicate that a replacement construct needs to be generated before the fixed-point program code is generated. As shown, the user may indicate that a replacement construct should be generated in order to allow the user device to generate fixed-point code. Alternatively, the user device may replace the floating-point function without prompting the user. For example, the user device may automatically generate the replacement construct and replace the floating-point function.

As shown in FIG. 1B, the user device may determine parameters associated with generating the replacement construct. As shown, the user device may determine user defined parameters (e.g., parameters selected and/or defined by the user, etc.), function analysis parameters (e.g., parameters based on an analysis of the floating-point function performed by the TCE), target optimization parameters (e.g., parameters associated with optimizing the fixed-point program code based on a particular target platform such as HDL or C), and/or one or more other types of parameters. As further shown, the user device may generate the replacement construct based on the parameters, and may replace the floating-point function with the replacement construct.

As further shown, the user may indicate that the user device is to generate the fixed-point program code based on the replacement construct, and the user device may generate the fixed-point program code. In this way, a user device may generate a replacement construct based on a floating-point function. This may allow the user device to generate program code, associated with the floating-point function, based on the replacement construct (e.g., rather than the floating-point function).

Figure 2:
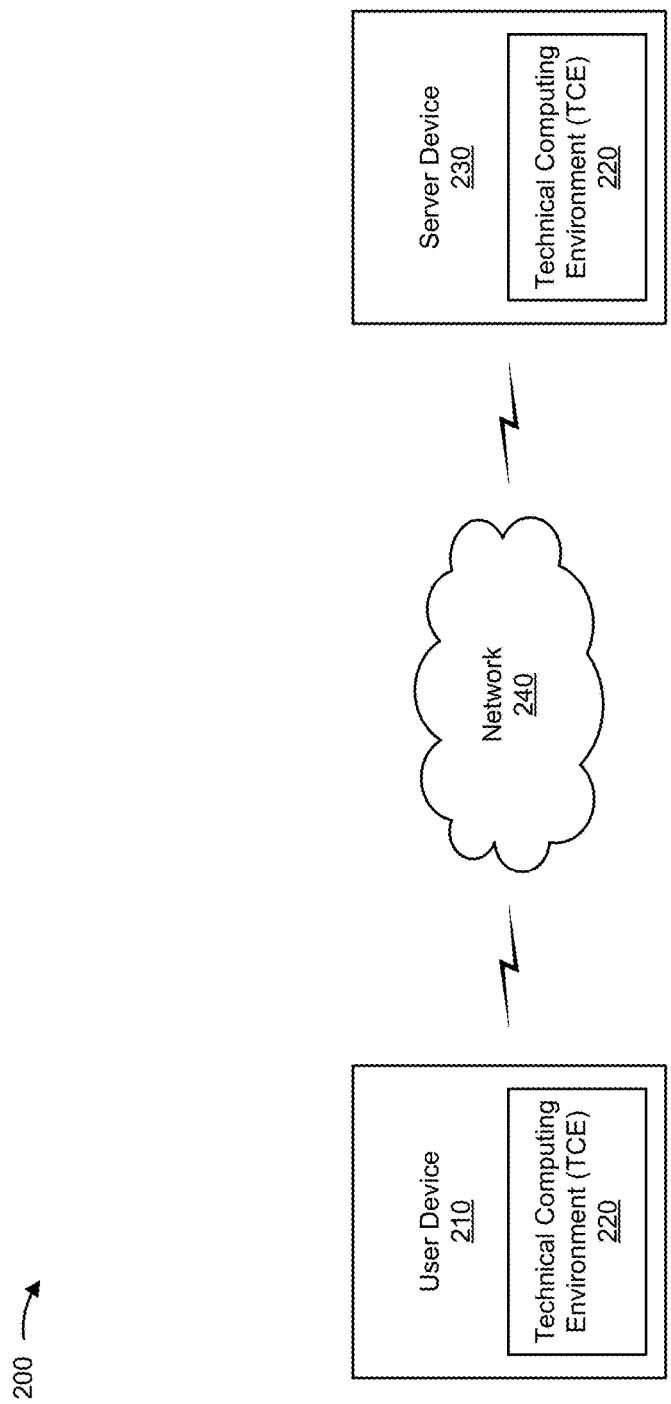
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

User device 210 may include a device capable of receiving, generating, processing, executing, and/or providing information associated with generating a replacement construct based on a floating-point function, and generating program code based on the replacement construct. For example, user device 210 may include a computing device, such as a desktop computer, a laptop computer, a tablet computer, a handheld computer, a server, a mobile phone (e.g., a smart phone, a radiotelephone, etc.), or a similar device. In some implementations, user device 210 may receive information from and/or transmit information to server device 230 (e.g., information associated with the replacement construct, information associated with the floating-point function, etc.).

User device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations.

TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 220 may further provide mathematical functions and/or graphical tools (e.g., for generating program code, converting floating-point program code to fixed-point program code, creating plots, surfaces, images, volumetric representations, etc.). In some implementations, TCE 220 may provide these functions and/or tools using toolboxes (e.g., toolboxes for code generation, floating-point to fixed-point conversion, signal processing, image processing, data plotting, parallel processing, etc.). In some implementations, TCE 220 may provide these functions as block sets or in another way, such as via a library, etc.

TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; StateWORKS Studio by StateWORKS, etc.), or another type of environment, such as a hybrid environment that may include, for example, a text-based environment and a graphically-based environment. TCE 220 may include, for example, a text-based environment (e.g., a rich-text editor) and/or a graphical environment (e.g., a graphical user interface (GUI)) that permits a user to input program code.

Server device 230 may include one or more devices capable of receiving, generating, storing, processing, and/or providing information associated with generating a replacement construct based on a floating-point function, and generating program code based on the replacement construct. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
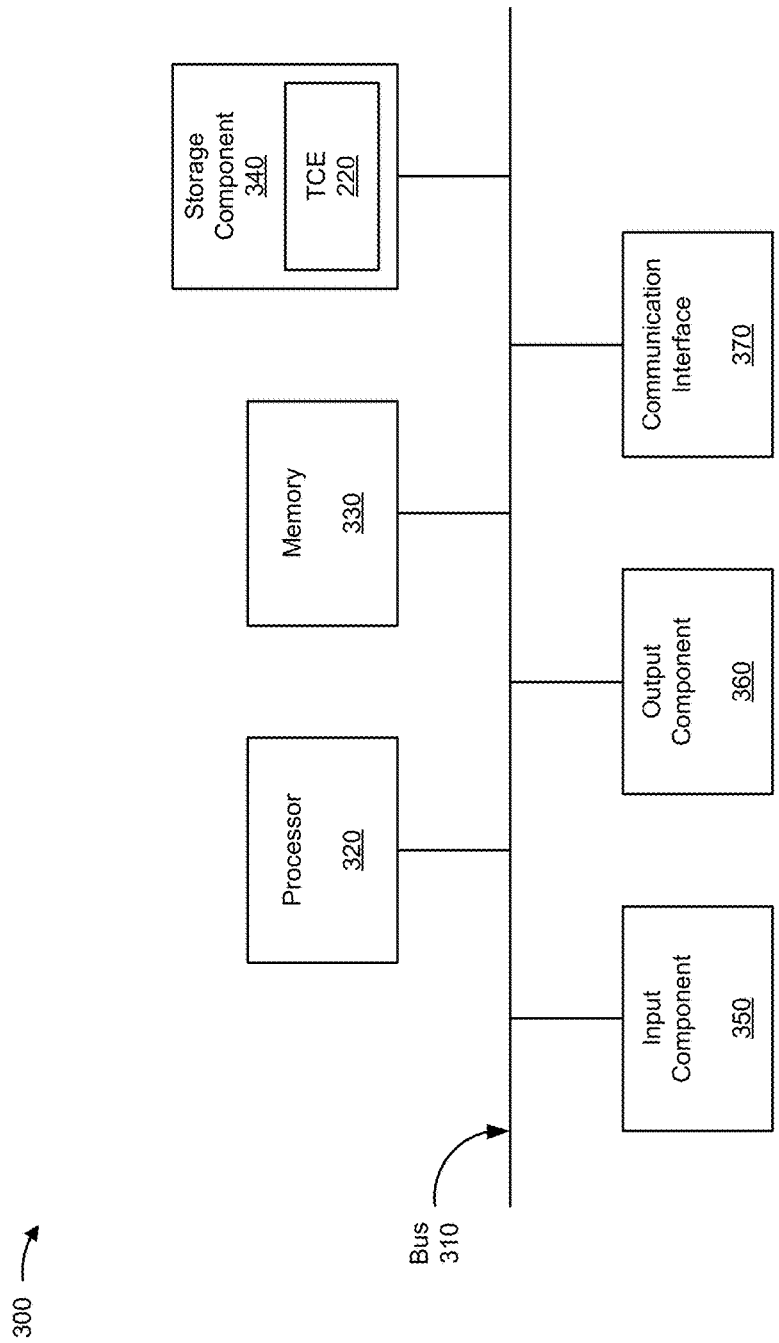
FIG. 3 is a diagram of example components of one or more devices of FIG. 2.

FIG. 3 is a diagram of example components of a device 300, which may correspond to user device 210 and/or server device 230. In some implementations, each of user device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium is defined as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
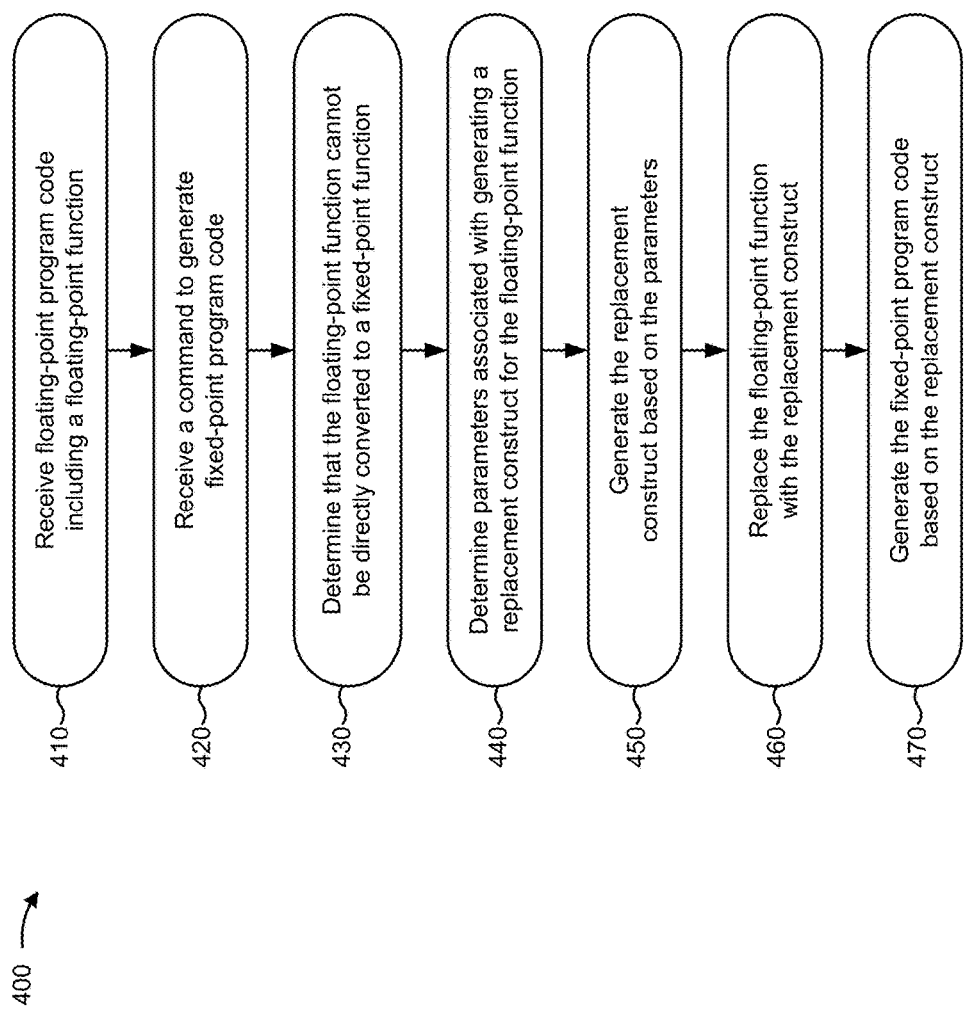
FIG. 4 is a flow chart of an example process for generating a replacement construct based on a floating-point function, and generating program code based on the replacement construct.

FIG. 4 is a flow chart of an example process 400 for generating a replacement construct based on a floating-point function, and generating program code based on the replacement construct. In some implementations, the process blocks of FIG. 4 may be performed by user device 210. In some implementations, one or more process blocks of FIG. 4 may be performed by another device or a group of devices separate from or including user device 210, such as server device 230.

As shown in FIG. 4, process 400 may include receiving floating-point program code including a floating-point function (block 410). For example, user device 210 may receive floating-point program code including a floating-point function. In some implementations, user device 210 may receive the floating-point program code based on user input. For example, user device 210 (e.g., TCE 220) may receive a request, from a user of user device 210, to access floating-point program code that includes the floating-point function. The request may include information identifying the floating-point program code, such as a name of the floating-point program code, and information identifying a memory location at which the floating-point program code is stored. The memory location may be located within user device 210 or external to, and possibly remote from, user device 210. User device 210 may, based on receiving the request, retrieve the floating-point program code from the memory location. In some implementations, user device 210 may provide, for display, a user interface that depicts all or a portion of the floating-point program code.

Additionally, or alternatively, the user may provide, via a command line interface associated with TCE 220, the floating-point program code that includes the floating-point function (e.g., when a programming language of TCE 220 is a floating-point language). Additionally, or alternatively, user device 210 may receive the floating-point program code in the form of a graphical model. For example, the user may provide, via a graphical modeling interface associated with TCE 220, information (e.g., a function block included in a model) that is described by floating-point program code that includes the floating-point function.

A floating-point function may include a mathematical function that is described in a programming language that uses floating-point representation to represent values associated with the mathematical function. For example, a result of evaluating the function may be in the form of a floating-point number.

In some implementations, the floating-point function may include a trigonometric function (e.g., a cosine function, an inverse cosine function, a hyperbolic cosine function, an inverse hyperbolic cosine function, a sine function, an inverse sine function, a hyperbolic sine function, an inverse hyperbolic sine function, a tangent function, an inverse tangent function, a hyperbolic tangent function, an inverse hyperbolic cotangent function, a four-quadrant inverse tangent function, etc.). Additionally, or alternatively, the floating-point function may include a logarithmic function (e.g., a logarithmic function, an inverse logarithmic function, a natural logarithmic function, etc.). Additionally, or alternatively, the floating-point function may include an elementary mathematical function (e.g., a divide function, an exponential function, a power function, a reciprocal function, a square root function, etc.). Additionally, or alternatively, the floating-point function may include a custom function (e.g., a custom function provided by the user, a custom expression provided by the user, a custom function handle provided by the user, etc.). Additionally, or alternatively, the floating-point function may include a piecewise function. Additionally, or alternatively, the floating-point function may include another type of function (e.g., a Bessel function, an error function, a complementary error function, a normal cumulative distribution function, a polynomial evaluation function, etc.).

As further shown in FIG. 4, process 400 may include receiving a command to generate fixed-point program code (block 420). For example, user device 210 (e.g., TCE 220) may receive a command to generate fixed-point program code based on the floating-point program code received by user device 210. In some implementations, user device 210 may receive the command based on detecting a selection of a particular menu item, entry of a particular textual or audible input from the user, and/or entry of some other predetermined input that identifies the desire to generate the fixed-point program code. Additionally, or alternatively, user device 210 may receive the command based on information received from another device, such as server device 230.

In some implementations, user device 210 may receive the command, and may determine that the floating-point function is to be converted to a fixed-point function. For example, the user may provide (e.g., via TCE 220) the command indicating that user device 210 is to generate the fixed-point program code, and user device 210 may determine that the programming language, associated with the fixed-point program code, uses fixed-point representation. In this example, user device 210 may determine that the floating-point function is to be converted to a fixed-point function before the fixed-point program code may be generated.

As further shown in FIG. 4, process 400 may include determining that the floating-point function cannot be directly converted to a fixed-point function (block 430). For example, user device 210 may determine that the floating-point function cannot be directly converted to a fixed-point function.

In some implementations, user device 210 may determine that the floating-point function cannot be directly converted to a fixed-point function based on information associated with the floating-point function. If the floating-point function cannot be directly converted, then user device 210 may determine that the floating-point function is to be replaced with a replacement construct. Alternatively, if the floating-point function can be converted, then user device 210 may convert the floating-point function without generating a replacement construct.

A replacement construct may include information (e.g., a set of commands) that represents an approximation of the floating-point function. However, unlike the floating-point function, the replacement construct may be directly converted to fixed-point representation (e.g., such that fixed-point program code may be generated based on the converted replacement construct). For example, a cosine function may be described in a floating-point programming language. However, user device 210 may be unable to convert the cosine function to fixed-point representation (e.g., when conversion of the cosine function is not supported by TCE 220). In this example, a possible replacement construct of the cosine function may include a lookup table that represents an approximation of the cosine function, since user device 210 may be able to convert the lookup table to fixed-point representation.

In some implementations, user device 210 may determine that the floating-point function is to be replaced with a replacement construct based on user input. For example, the user may wish to replace the floating-point function with a replacement construct that optimizes execution of a model that includes the floating-point function.

Additionally, or alternatively, user device 210 may automatically determine that the floating-point function is to be replaced with a replacement construct. For example, user device 210 may automatically determine (e.g., after user device 210 receives the command to generate the fixed-point program code) that the floating-point function is not supported by TCE 220, and user device 210 may recommend, to a user of user device 210, that the floating-point function be replaced with a replacement construct. In this example, user device 210 may also automatically determine one or more possible types of replacement construct architecture and/or may recommend a particular replacement construct architecture to the user, as discussed below.

As further shown in FIG. 4, process 400 may include determining parameters associated with generating a replacement construct for the floating-point function (block 440). For example, user device 210 may determine parameters associated with generating a replacement construct. In some implementations, user device 210 may determine parameters associated with generating the replacement construct when user device 210 determines that the floating-point function is to be replaced with the replacement construct. Additionally, or alternatively, user device 210 may determine the parameters when user device 210 analyzes the fixed-point function, as discussed below. Additionally, or alternatively, user device 210 may determine the parameters when user device 210 receives information, indicating that user device 210 is to determine the parameters, from another device, such as server device 230.

Parameters associated with generating a replacement construct may include one or more factors that identify a manner in which user device 210 (e.g., TCE 220) generates the replacement construct. In some implementations, user device 210 may determine the parameters based on an evaluation of the function (e.g., an automatic evaluation, an evaluation performed without intervention from the user). For example, user device 210 may evaluate the function by performing a compile time program analysis, a numerical analysis, etc., and user device 210 may determine one or more parameters, associated with generating the replacement construct, based on the evaluation.

For example, the parameters may include information associated with an architecture used to generate the replacement construct, such as a lookup table architecture, a coordinate rotation digital computer (CORDIC) architecture, a Newton-Raphson architecture, a Taylor series architecture, a Padé approximant architecture, or another type of architecture. In some implementations, the architecture may indicate a method that user device 210 uses to approximate a value associated with the floating-point function. In some implementations, user device 210 may automatically determine the information associated with the architecture to be used to generate the replacement construct. For example, user device 210 may receive the command to generate the fixed-point program code, may determine that the floating-point function is not supported by TCE 220, and may perform an evaluation of the floating-point function. In this example, user device 210 may automatically (e.g., without input from the user) determine possible architectures that may be used for the replacement construct, may present the possible architectures to the user, and the user may select an architecture of the possible architectures. Additionally, or alternatively, user device 210 may recommend a particular type of architecture (e.g., when the evaluation indicates that a particular type of architecture is suitable).

The systems and/or methods described herein are discussed primarily in the context of a lookup table architecture. However, these systems and/or methods may equally apply to another type of architecture (e.g., a CORDIC architecture, a Newton-Raphson architecture, a Taylor series architecture, a Padé approximant architecture, etc.).

In some implementations, the parameters may include information that identifies a range of values associated with the floating-point function. For example, user device 210 may determine an input range of values (e.g., a minimum value and a maximum value that may be used to evaluate the floating-point function based on a user design) associated with the floating-point function. As another example, user device 210 may determine an output range of values (e.g., a minimum value and a maximum value that may indicate a result of evaluating the floating-point function based on the user design) associated with the floating-point function.

In some implementations, the range of values may indicate a range of values that is to be included in a lookup table associated with the floating-point function. For example, user device 210 may determine that an input range of values, associated with a floating-point function, includes values from 0.00 to 1.00. In this example, the replacement construct may include an input range that includes values from 0.00 to 1.00. In some implementations, user device 210 may determine the information that identifies the range of values by evaluating the floating-point function. For example, user device 210 may perform an input range analysis by evaluating (e.g., by performing a compile time program analysis based on the floating-point function, by performing a numerical analysis based on the floating-point function, etc.) the floating-point function and may determine the information that identifies the range of values based on the function evaluation. Additionally, or alternatively, user device 210 may automatically (e.g., without user intervention) determine the information that identifies the range of values. For example, user device 210 may automatically determine the information associated with the range of values when user device 210 evaluates the floating-point function. Additionally, or alternatively, user device 210 may determine a parameter associated with a datatype for a variable included in the floating-point function.

Additionally, or alternatively, the parameters may include information associated with a quantity of values associated with the architecture. For example, user device 210 may determine a quantity of values to include in a lookup table (e.g., 100, 1000, etc.). In some implementations, the quantity of values may be uniform (e.g., when the difference between all adjacent values included in the lookup table is equal). Additionally, or alternatively, the quantity of values may be optimized (e.g., when the difference between adjacent values varies depending on a rate of change associated with the floating-point function). For example, the difference between adjacent values in an optimized lookup table may be minimized when a rate of change of the function is large (e.g., such that values included in the lookup table are closer together when a plot of the floating-point function curves). Similarly, the difference between adjacent values in an optimized lookup table may be maximized when a rate of change of the function is small (e.g., such that values included in the lookup table are further apart when a plot of the floating-point function is linear).

Additionally, or alternatively, the parameters may include information associated with an interpolation associated with the architecture. For example, user device 210 may determine an interpolation method that is to be used to determine values between two values included in a lookup table included in the replacement construct. In some implementations, the interpolation method may be a linear interpolation method, a quadratic interpolation method, a cubic interpolation method, or another type of interpolation method. In some implementations, user device 210 may determine a parameter that indicates that no interpolation method should be used. For example, the user may indicate that the values included in the lookup table are to be used without interpolation between the values.

Additionally, or alternatively, the parameters may include information that identifies an error threshold associated with the architecture. For example, user device 210 may determine a maximum error threshold that is to be used when generating the replacement construct. In some implementations, the maximum error threshold may indicate a maximum allowable difference between a result provided by the floating-point function, and a result provided by the replacement construct. For example, assume that an error threshold is 0.001. In this example, if a floating-point square root function, is evaluated using an input value of 2 to provide a result of 1.4142, then a replacement construct, when evaluated using the input value of 2, must provide a result within the 0.001 error threshold. For example, a replacement construct result of 1.4145 meets the error threshold since it is 0.0001 away from the floating-point square root function result, but a replacement construct result of 1.416 does not meet the error threshold since it is 0.002 away from the floating-point square root function result.

In some implementations, user device 210 may determine one or more other types of parameter associated with generating the replacement construct.

In some implementations, user device 210 may determine the parameters based on user input. For example, user device 210 may provide a user interface (e.g., a command line interface, etc.), the user may provide input that indicates the parameters, and user device 210 may determine the parameters based on the user input. Additionally, or alternatively, user device 210 may determine the parameters based on an analysis associated with the floating-point function. For example, user device 210 (e.g., TCE 220) may include a tool that may be capable of analyzing the floating-point function (e.g., a tool that is capable of executing and/or testing a function file that includes the floating-point function, a tool that is capable of analyzing a performance of a model that includes the function, etc.), and user device 210 may determine the parameters based on a result provided by the tool. In some implementations, user device 210 may determine the parameters (e.g., using an analysis tool), user device 210 may provide the parameters to the user, and the user may accept and/or modify the parameters.

In some implementations, user device 210 may determine the parameters based on an optimization associated with a target platform for the generated fixed-point program code (e.g., an HDL platform, a C platform, etc.). For example, user device 210 may determine that the user wishes to generate HDL program code based on the replacement construct. In this example, user device 210 may determine particular parameters (e.g., a quantity of values to include in a lookup table, etc.) that may be optimized to operate efficiently when the generated HDL program code is executed.

In some implementations, user device 210 may determine a default set of parameters associated with the replacement construct. For example, user device 210 may determine a first set of default parameters when the user wishes to generate HDL program code, and user device 210 may determine a second set of default parameters when the user wishes to generate C program code. In some implementations, user device 210 may store the default parameters in a memory location of user device 210. Additionally, or alternatively, user device 210 may receive the default parameters from another device (e.g., when server device 230 stores information associated with the default parameters).

Additionally, or alternatively, user device 210 may determine the parameters based on an optimized speed and/or optimized area associated with the replacement construct. For example, user device 210 may determine different parameters (e.g., different interpolation methods, different architectures, etc.) such that a speed and/or an area associated with executing program code based on the replacement construct may be optimized (e.g., an area may be optimized when a lookup table includes few values, but a speed may not be optimized since interpolation may be required more often during execution, a speed may be optimized when the lookup table includes many values, but the area may not be optimized since the lookup table includes a large number of values, etc.).

Figure 5:
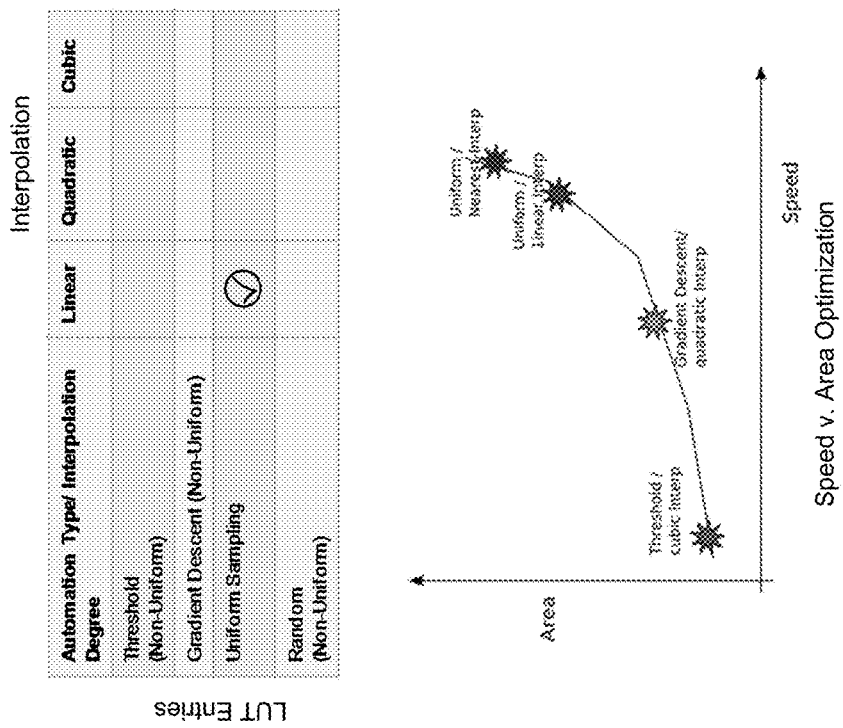
FIG. 5 is an example of a speed versus area optimization associated with the example process shown in FIG. 4.

In some implementations, the user may provide input indicating a speed/area optimization preference, and user device 210 may determine the parameters based on the user input. For example, as shown in FIG. 5, the user may select, via a user interface, a type of interpolation (e.g., linear, quadratic, cubic, etc.) and a lookup table construction technique (e.g., threshold (non-uniform), gradient descent (non-uniform), uniform sampling, random (e.g., non-uniform) to indicate a manner in which user device 210 is to construct a lookup table. In this manner, the user may indicate a speed and/or an area optimization associated with executing program code based on the lookup table. As further shown in FIG. 5, in some implementations, the speed and/or area optimization may be illustrated in the form of a speed/area curve.

In some implementations, user device 210 may determine the parameters based on a global optimization associated with two or more floating-point functions. For example, user device 210 may determine that two or more replacement constructs are to be generated (e.g., when fixed-point program code is to be generated based on two or more floating-point functions), and user device 210 may determine the parameters based on a global optimization associated with the two or more replacement constructs.

In some implementations, the global optimization may be associated with homogenizing two or more domains based on a range of values associated with the two or more floating-point functions. For example, user device 210 may determine (e.g., using a function analysis tool) that a first floating-point function has a first range of input values (e.g., −10 to 5) and a first range of output values (e.g., 1.5 to 5.0), and that a second floating-point function has a second range of input values (e.g., −5 to 10) and a second range of output values (e.g., 2.0 to 6.0). In this example, user device 210 may determine that a single replacement construct including a global set of input values (e.g., −10 to 10) and a global set of output values (e.g., 1.5 to 6.0) may be used replace each of the two floating-point functions (e.g., since the input value ranges and the output values ranges overlap, only a single replacement construct may be necessary).

As another example, user device 210 may determine that a single replacement construct may be used when two floating-point functions are related by an offset (e.g., a single replacement construct may be used to replace a sine function, y=sin(x), and a cosine function, z=cos(x), since the cosine function is a 90 degree offset of the sine function).

Figure 6:
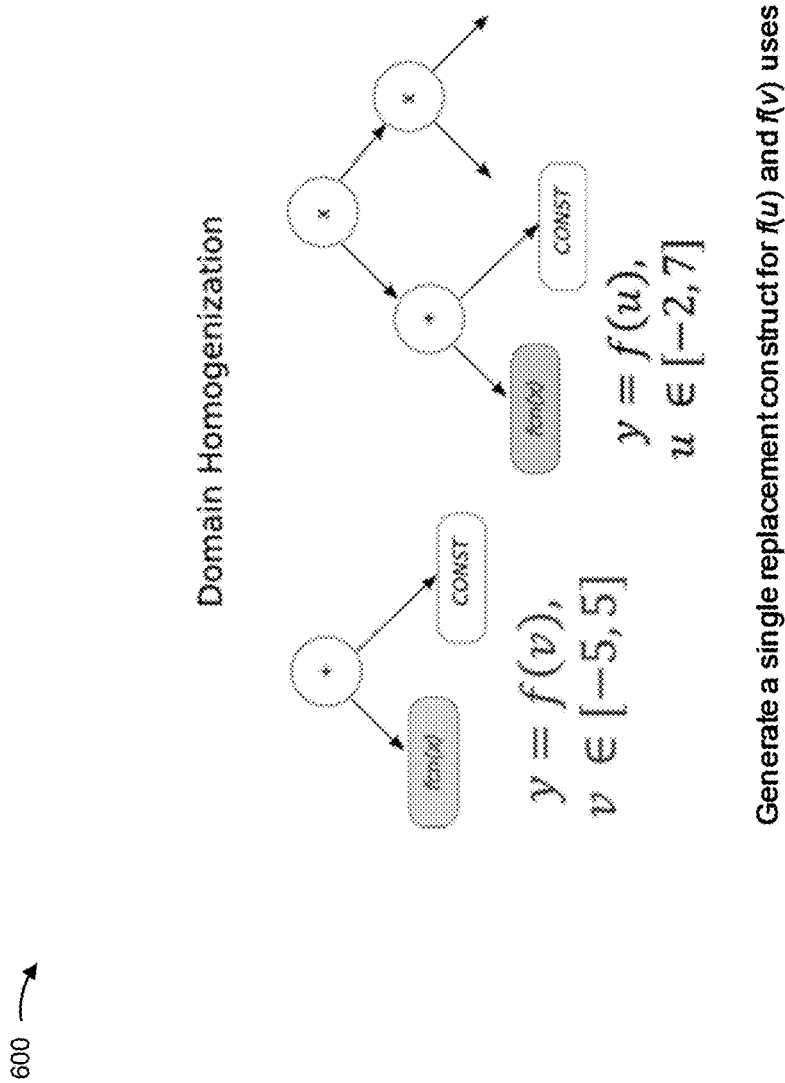
FIG. 6 is an example of a global optimization, associated with the example process shown in FIG. 4, based on homogenizing two or more ranges of input values.

Additionally, or alternatively, the global optimization may be associated with homogenizing two or more domains based on two or more ranges of values associated with two or more floating-point functions. For example, as shown in FIG. 6, assume that a floating-point function (e.g., f) is evaluated using a first variable (e.g., v) and a second variable (e.g., u). In this example, if an input range associated with the first variable (e.g., −5 to 5) overlaps an input range associated with the second variable (e.g., −2 to 7), then user device 210 may generate a single replacement construct for the floating-point function that covers a function evaluation based on the first variable or the second variable (e.g., the replacement construct may be based on an input range of values from −5 to 7).

In this way, user device 210 may determine a variety of combinations of parameters (e.g., combinations of architectures, interpolation methods, optimizations, etc.) that are to be used to generate the replacement construct. The variety of available possible combinations of parameters may allow for any floating-point function to be replaced with a replacement construct that may be used to generate fixed-point program code.

As further shown in FIG. 4, process 400 may include generating the replacement construct based on the parameters (block 450). For example, user device 210 may generate the replacement construct based on the parameters determined by user device 210. In some implementations, user device 210 may generate the replacement construct when user device 210 determines the parameters (e.g., after user device 210 determines the parameters). Additionally, or alternatively, user device 210 may generate the replacement construct when the user provides, via user device 210, input indicating that user device 210 is to generate the replacement construct. Additionally, or alternatively, user device 210 may generate the replacement construct when user device 210 receives information, indicating that user device 210 is to generate the replacement construct, from another device (e.g., server device 230).

In some implementations, user device 210 may generate the replacement construct based on the parameters determined by user device 210. For example, user device 210 may determine that the replacement construct is to be in the form of a lookup table, may determine a range of input values (e.g., −10.0 to 10.0), may determine a range of output values (e.g., 0.00 to 8.50), may determine a quantity of values (e.g., 1000) to be included in the lookup table, and may determine that a quadratic interpolation method is to be used to determine values between values in the lookup table. In this example, user device 210 may generate the replacement construct based on the parameters using a known procedure for generating a lookup table.

In some implementations, user device 210 may generate the replacement construct, and may provide, to the user, information associated with a comparison between the floating-point function and the replacement construct. For example, user device 210 may generate the replacement construct and may perform an analysis of the replacement construct by comparing output values, derived from the replacement construct, to output values provided by the floating-point function. This may allow the user to determine how accurately the replacement construct models the floating-point function.

In some implementations, user device 210 may allow the user to modify and/or further optimize the replacement construct by modifying, removing, adding, etc. parameters used to generate the replacement construct. For example, user device 210 may generate a first replacement construct based on a first set of parameters, and may provide information associated with the first replacement construct, such as an error threshold. In this example, the user may modify and/or further optimize the first set of parameters (e.g., to require a lower error threshold) to create a second set of parameters, and user device 210 may generate a second replacement construct based on the second set of parameters. In this way, the user may iteratively modify and/or optimize the replacement construct as the user wishes.

As further shown in FIG. 4, process 400 may include replacing the floating-point function with the replacement construct (block 460). For example, user device 210 may replace the floating-point function with the replacement construct generated by user device 210. In some implementations, user device 210 may replace the floating-point function with the replacement construct when user device 210 generates the replacement construct (e.g., after user device 210 generates the replacement construct). Additionally, or alternatively, user device 210 may replace the floating-point function with the replacement construct when the user indicates that user device 210 is to replace the floating-point function (e.g., after the user approves and/or optimizes the replacement construct). Additionally, or alternatively, user device 210 may replace the floating-point function with the replacement construct when user device 210 receives information, indicating that user device 210 is to replace the floating-point function, from another device, such as server device 230.

In some implementations, user device 210 may replace the floating-point function with the replacement construct within a user interface associated with the floating-point function. For example, user device 210 may generate a replacement construct for a floating-point function displayed via a command line interface, and user device 210 may replace the floating-point function displayed in the command line interface with the replacement construct. In this example, the program code associated with the floating-point function may be replaced and the program code associated with the replacement construct may be visible to the user.

Additionally, or alternatively, user device 210 may create a copy of a file associated with the floating-point function, and user device 210 may replace the floating-point function with the replacement construct within the file. For example, the floating-point function may be included in a model stored in a memory location of user device 210. In this example, user device 210 may create a copy of the model, and may replace the floating-point function, within the model, with the replacement construct.

In some implementations, user device 210 may store the replacement construct (e.g., a file and/or a model that includes the replacement construct), in a storage location of user device 210 and/or server device 230. This may allow the user may retrieve, reuse, and/or modify the replacement construct at a future time.

As further shown in FIG. 4, process 400 may include generating the fixed-point program code based on the replacement construct (block 470). For example, user device 210 may generate the fixed-point program code based on the replacement construct. In some implementations, user device 210 may generate the fixed-point program code when user device 210 replaces the floating-point function with the replacement construct (e.g., after user device 210 replaces the floating-point function). Additionally, or alternatively, user device 210 may generate the fixed-point program code when the user provides input indicating that user device 210 is to generate the fixed-point program code. Additionally, or alternatively, user device 210 may generate the fixed-point program code when user device 210 receives information, indicating that user device 210 is to generate the fixed-point program code from another device, such as server device 230.

In some implementations, user device 210 may generate the fixed-point program code using a tool included in TCE 220. For example, TCE 220 may include a floating-point to fixed-point conversion tool (e.g., a tool configured to convert floating-point program code to fixed-point program code), and user device 210 may generate the fixed-point program code using the floating-point to fixed-point conversion tool. In this example, user device 210 may be able to generate the fixed-point program code since the floating-point function has been replaced by the replacement construct.

In some implementations, the fixed-point program code, generated by user device 210, may be used to program an integrated circuit. For example, user device 210 may generate HDL program code, and the HDL program code may be used to program a field-programmable gate array (FPGA). As an additional example, user device 210 may generate C program code, and the C program code may be used to program a microprocessor.

Although FIG. 4 shows example blocks of process 400, in some implementations, process 400 may include additional blocks, different blocks, fewer blocks, or differently arranged blocks than those depicted in FIG. 4. Additionally, or alternatively, one or more of the blocks of process 400 may be performed in parallel.

FIGS. 7A-7D are diagrams of an example implementation 700 relating to the example process 400 shown in FIG. 4. For the purposes of example implementation 700, assume that a user device, UD1, hosts a technical computing environment, TCE. Further, assume that a command line interface, associated with TCE, allows a user of UD1 to input information associated with a function to be executed by TCE. Finally, assume that the programming language used by TCE uses floating-point representation (e.g., such that a function, provided by the user, is a floating-point function).

Figure 7A:
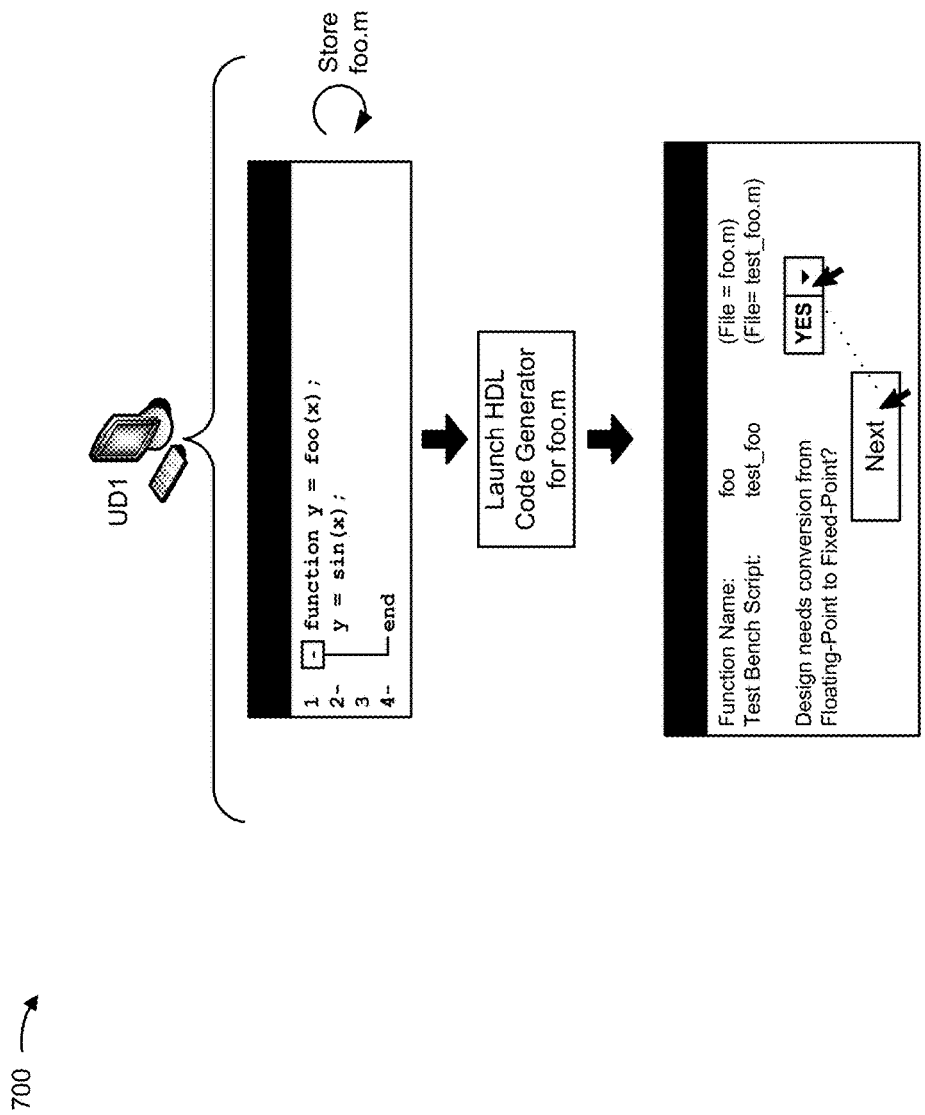

As shown in FIG. 7A, the user may provide information (e.g., via a keyboard associated with UD1) declaring a function, foo, that accepts an input, x, and returns an output, y. As further shown, the user may provide information indicating that y is calculated by evaluating a sine function using the value of x (e.g., y=sin(x)). For the purposes of example implementation 700, assume that the sine function is a floating-point function, and that a floating-point function may not be used to generate HDL program code. As shown, UD1 may store the information associated with the foo function (e.g., that includes the sine function) in a function file (e.g., foo.m).

As further shown, UD1 may determine (e.g., based on input provided by the user) that that UD1 is to launch an HDL program code generator that is configured to generate HDL program code (e.g., a type of fixed-point program code) based on a function described in the floating-point program language used by TCE. As shown, the user may provide, via a user interface of TCE, information indicating that HDL program code is to be generated based on the foo.m file (e.g., UD1 is to generate HDL program code for the sine function included in foo.m).

As further shown, assume that a test bench script, test_foo.m, has been created (e.g., by the user) for the purpose of calling the foo function (e.g., such that the HDL program code generator may analyze the foo function for the purpose of generating the HDL program code). As further shown, the user may indicate, via a user interface of TCE, that the floating-point program code, associated with the foo function, is to be converted to fixed-point program code prior to generating the HDL program code. As shown, the user may choose proceed with generating the HDL program code (e.g., by selecting a Next button).

As shown in FIG. 7B, UD1 (e.g., the HDL program code generator) may determine that the sine function, included in the foo function file, may not be converted to fixed-point representation as required for HDL program code generation (e.g., assume that TCE does not support converting any floating-point trigonometric function to fixed-point representation). As shown, UD1 may provide information indicating that the sine function must be replaced with a replacement construct, and the user may indicate (e.g., by selecting a Proceed button) that UD1 is to generate a replacement construct associated with the sine function.

As further shown in FIG. 7B, UD1 may evaluate the foo function (e.g., based on the test_foo.m test bench script) in order to determine an input value range and an output value range associated with the sine function. In example implementation 700, assume that UD1 determines the input value range to be −1.00 to 2.00 and the output value range to be −0.84 to 1.00. As shown, the user may choose to accept the input value range and the output value range (e.g., and proceed with identifying parameters associated with generating the replacement construct) or modify the test_foo.m test bench script (e.g., and cause UD1 to evaluate the foo function using the modified test bench script). As shown, assume that the user chooses to accept the input value range and the output value range (e.g., by selecting a Continue button).

Figure 7C:
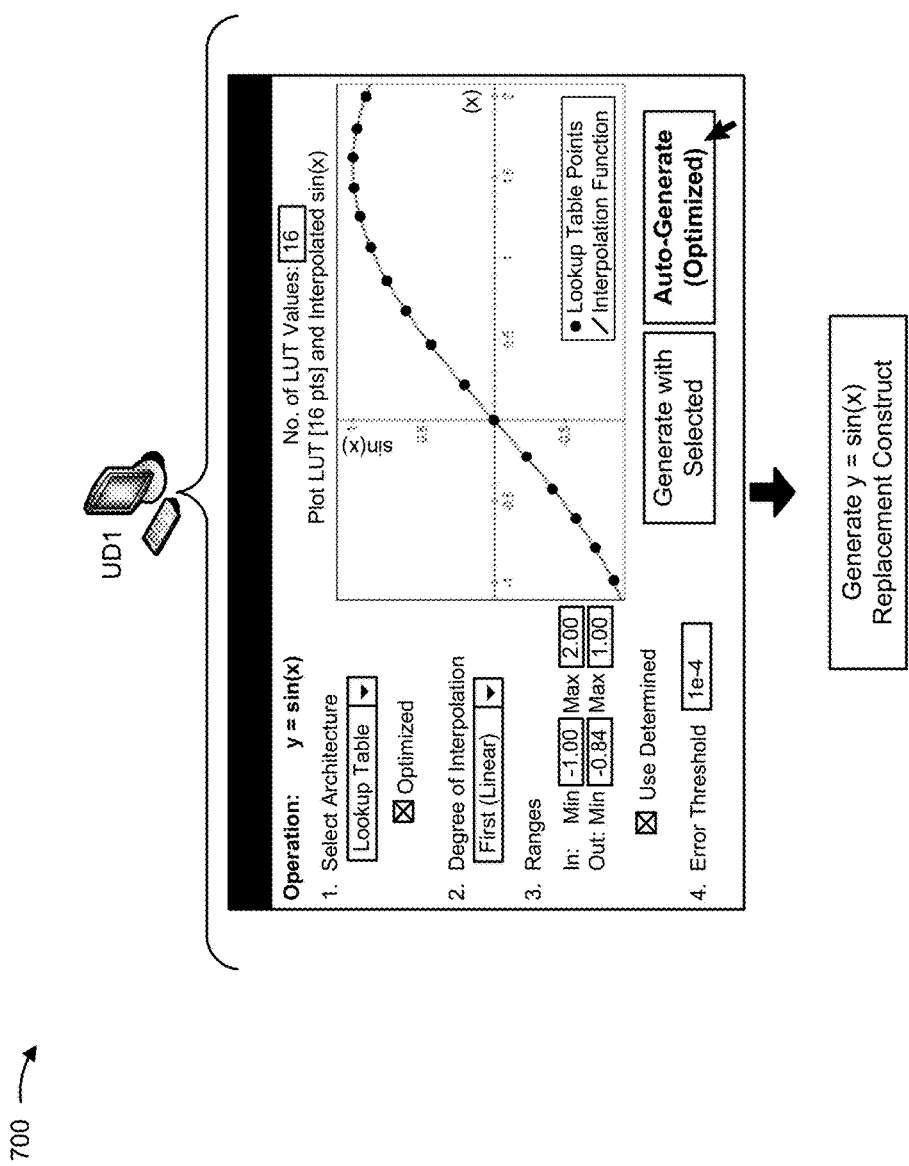

As shown in FIG. 7C, UD1 may determine optimized parameters for generating the replacement construct, and may display a user interface that includes the optimized parameters determined by UD1. For example, UD1 may perform an analysis of the sine function using the foo_test.m test bench script to determine optimized parameters. As shown, UD1 may determine optimized parameters that indicate that the replacement construct is to be generated using a lookup table architecture, that the lookup table is to be optimized, that first degree (e.g., linear) interpolation is to be used to determine values between the values included in the lookup table, that the input value range and the output value range used to generate the lookup table are those determined by UD1 (e.g., as described with respect to FIG. 7B), that an error threshold of $1 \times 10^{-4}$ is to be used when generating the replacement construct, and that 16 values are to be included in the lookup table. As shown, TCE may also generate and display a plot of the interpolated version of the sine function based on the replacement construct described by the optimized parameters.

As shown, the user interface may also allow the user to choose whether to (1) instruct UD1 to automatically generate an optimized replacement construct for the sine function based on the optimized parameters determined by UD1, or (2) modify the optimized parameters, determined by UD1, such that a set of user defined parameters may be used to generate the replacement construct. As shown, the user may modify (e.g., via drop down menus, check boxes, text boxes, etc.) the optimized parameters, if desired. In some implementations, the user may also modify and/or specify one or more parameters via a command line interface associated with TCE (e.g., rather than the graphical interface).

As further shown, the user may indicate (e.g., by selecting an Auto-Generate (Optimized) button) that UD1 is to generate the replacement construct based on the optimized parameters determined by UD1 (e.g., rather than generating the replacement construct based on user selected and/or modified parameters). As further shown, UD1 may generate (e.g., using a known method) the replacement construct (e.g., the lookup table) based on the optimized parameters.

Figure 7D:
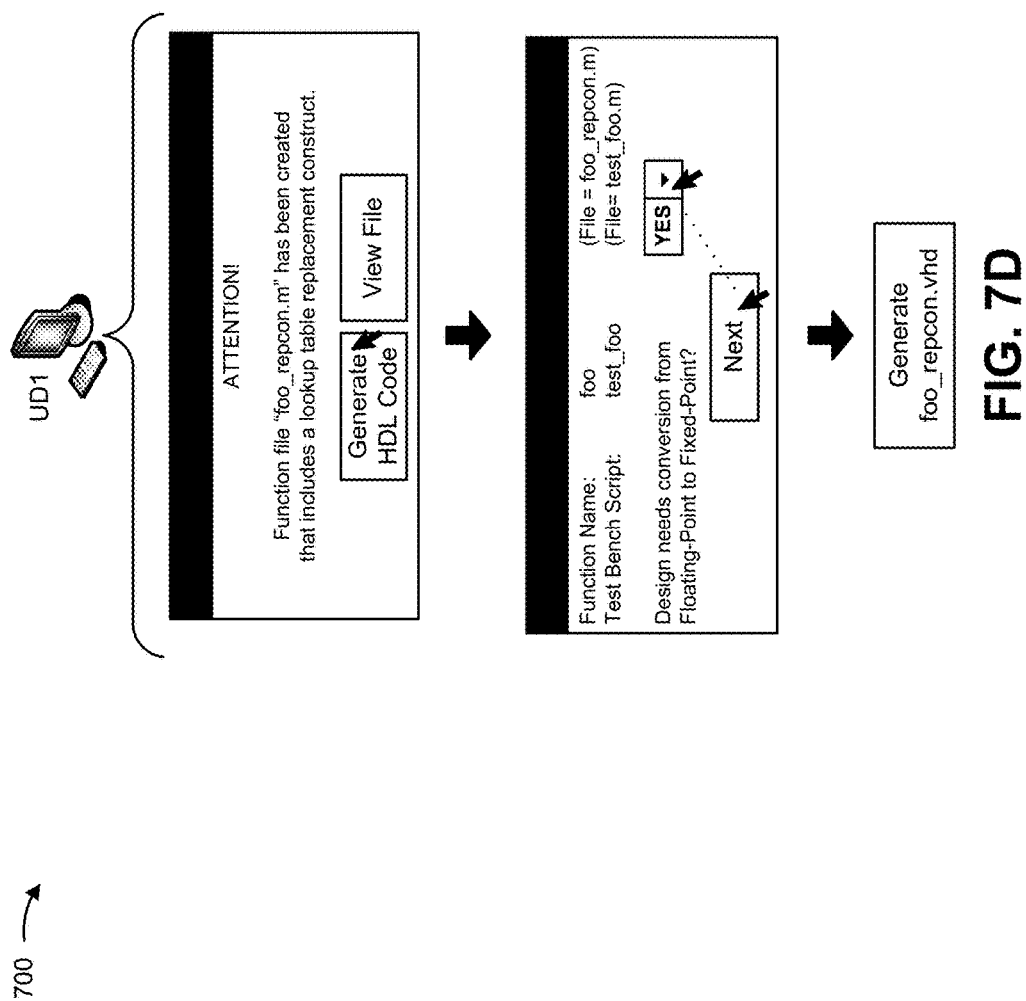

As shown in FIG. 7D, UD1 may create and store a modified foo function file (e.g., foo_repcon.m.) that includes the generated lookup table. As shown, the user may indicate that UD1 is to generate HDL program code (e.g., by selecting a Generate HDL Code button).

As further shown, the user may provide, via a user interface of TCE, information indicating that the HDL program code is to be generated based on the program code included in the foo_repcon.m file (e.g., UD1 is to generate HDL program code for the foo function that includes the lookup table rather than the sine function). As further shown, the user may indicate, via the user interface of TCE, that the floating-point program code, associated with the foo function described in the foo_repcon.m file, is to be converted to fixed-point program code prior to generating the HDL program code. As shown, the user may choose to proceed with generating the HDL program code (e.g., by selecting a Next button). As shown, the HDL program code generator may now generate the HDL program code (e.g., foo_repcon.vhd) based on the foo_repcon.m file. In this example, the HDL program code generator may be able to generate the HDL program code since the floating-point function, included in the foo.m file, was replaced with the replacement construct in the foo_repcon.m file (e.g., since the lookup table can be converted to fixed-point representation as required for HDL code generation).

As indicated above, FIGS. 7A-7D are provided merely as an example. Other examples are possible and may differ from what was described with regard to FIGS. 7A-7D.

Figure 8A:
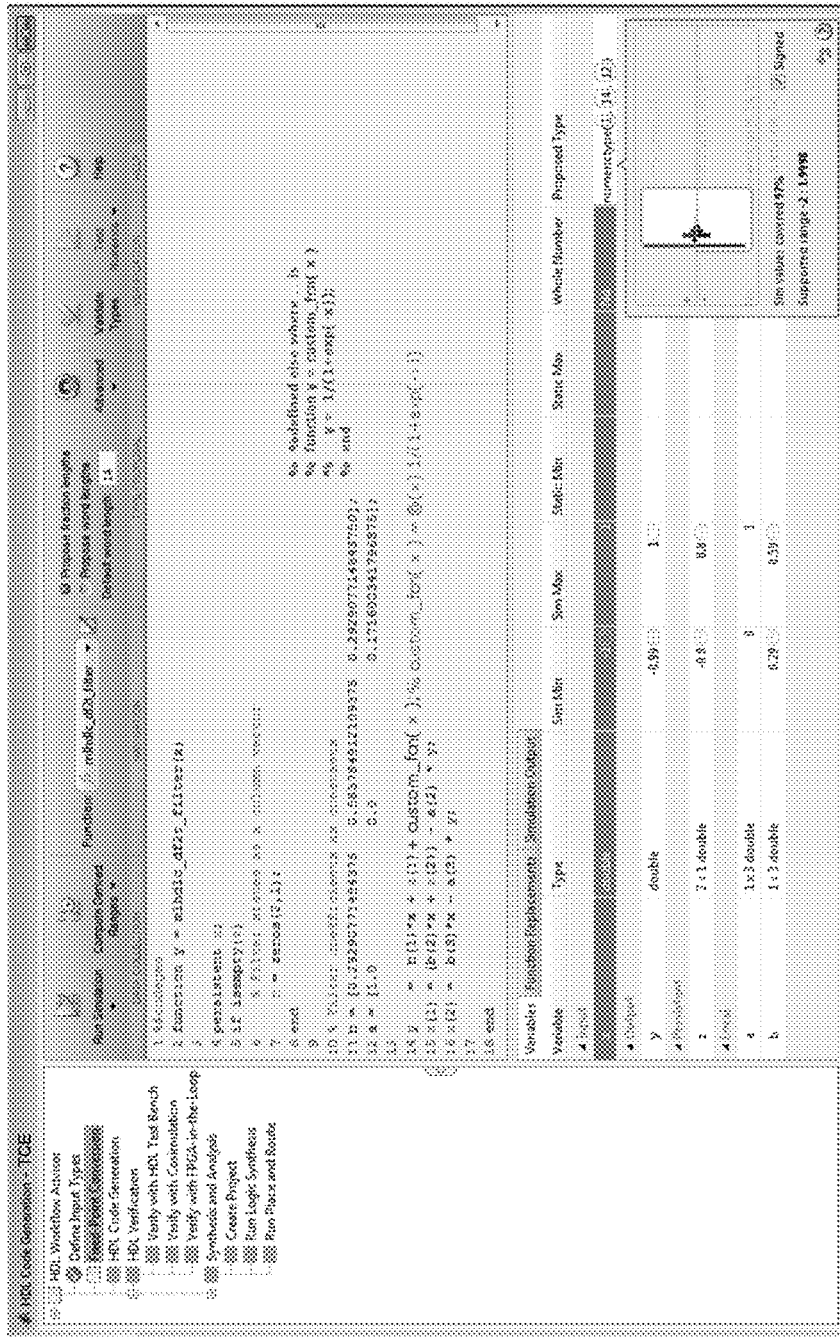
Figure 8B:
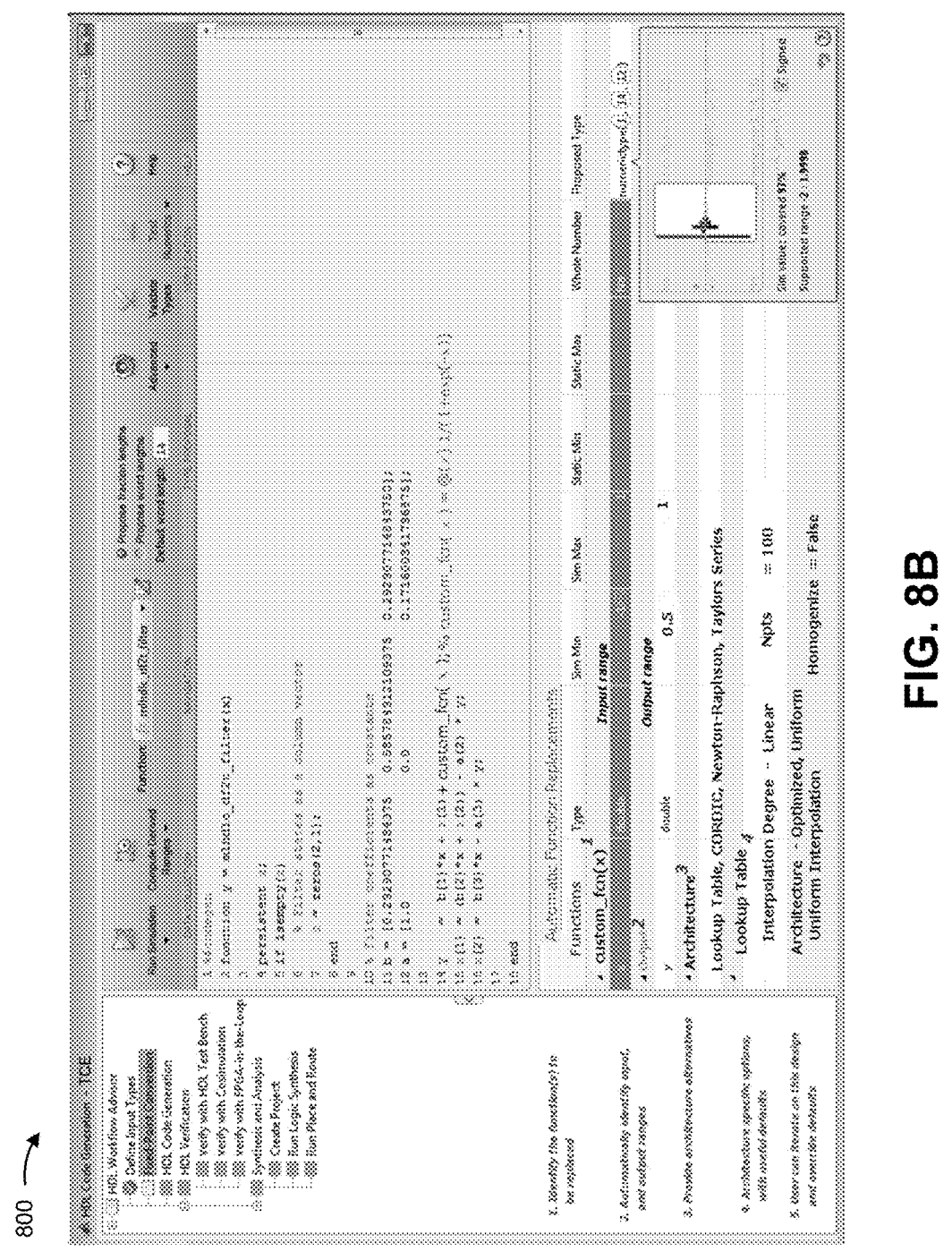
Figure 8C:
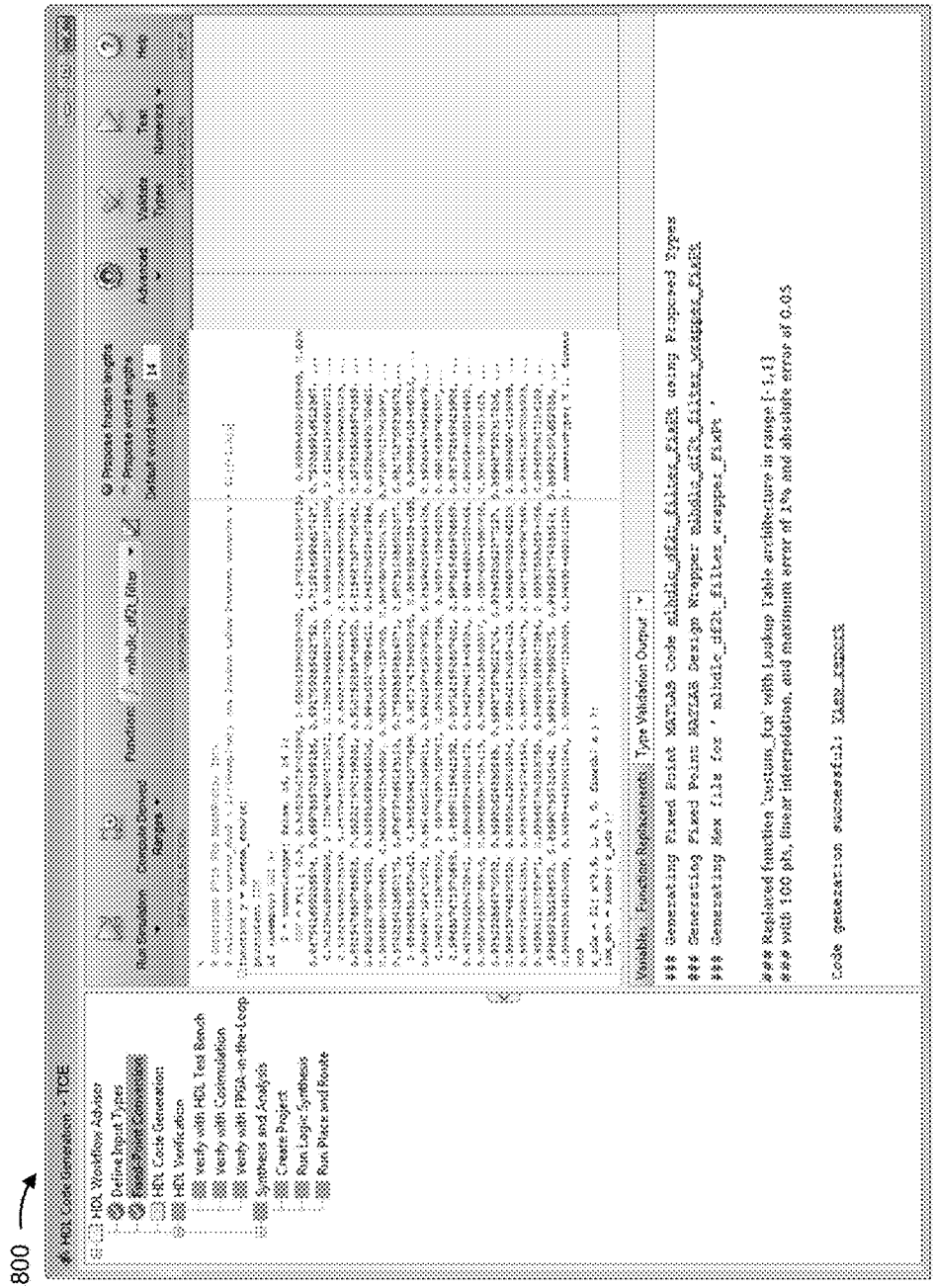

FIGS. 8A-8C are diagrams of an example graphical user interface implementation 800 relating to example process 400 shown in FIG. 4. For purpose of example graphical user interface implementation 800, assume that a user has provided floating-point program code that includes a custom (e.g., user defined) function (e.g., y=1/(1+exp(-x))), and that the user wishes to generate HDL program code based on the floating-point program code. Further, assume that the floating-point program code is to be converted to a fixed-point representation before the HDL program code may be generated.

As shown in FIG. 8A, an HDL code generation tool, associated with the TCE, may identify that the floating-point program code includes the custom function, may indicate (e.g., by highlighting the floating-point program code associated with the custom function) that the custom function cannot be directly converted a fixed point representation, and may indicate that the custom function is to be replaced with a replacement construct.

As shown in FIG. 8B, the HDL code generation tool may perform an evaluation of the custom function to determine default parameters (e.g., a set of default parameters optimized for HDL code generation) associated with generating the replacement construct. For example, the HDL code generation tool may determine an input range (e.g., −1 to 1) for the input variable of the custom function (e.g., x), and may determine an output range (e.g., 0.5 to 1.0) for the output variable of the custom function (e.g., y). As also shown, the HDL code generation tool may determine one or more possible architectures that may be used to generate the replacement construct (e.g., CORDIC, Newton-Raphson, Taylor series, Lookup Table), and other default architecture specific options (e.g., interpolation degree—linear, number of points—100, architecture—optimized, uniform, uniform interpolation, homogenize—false). The user may select and/or modify the replacement construct parameters, if desired. In some implementations, the HDL code generation tool may also display a plot, associated with the possible replacement construct and the custom function, that may be updated (e.g., in real-time) as the user selects and/or modifies various replacement construct parameters.

As shown in FIG. 8C, the HDL code generation tool may generate the replacement construct based on the default and/or selected parameters, and may replace the floating-point program code, associated with the custom function, with the replacement construct. The HDL code generation tool may then proceed with generating the HDL program code based on the replacement construct.

As indicated above, FIGS. 8A-8C are provided merely as an example. Other examples are possible and may differ from what was described with regard to FIGS. 8A-8C.

Figure 9A:
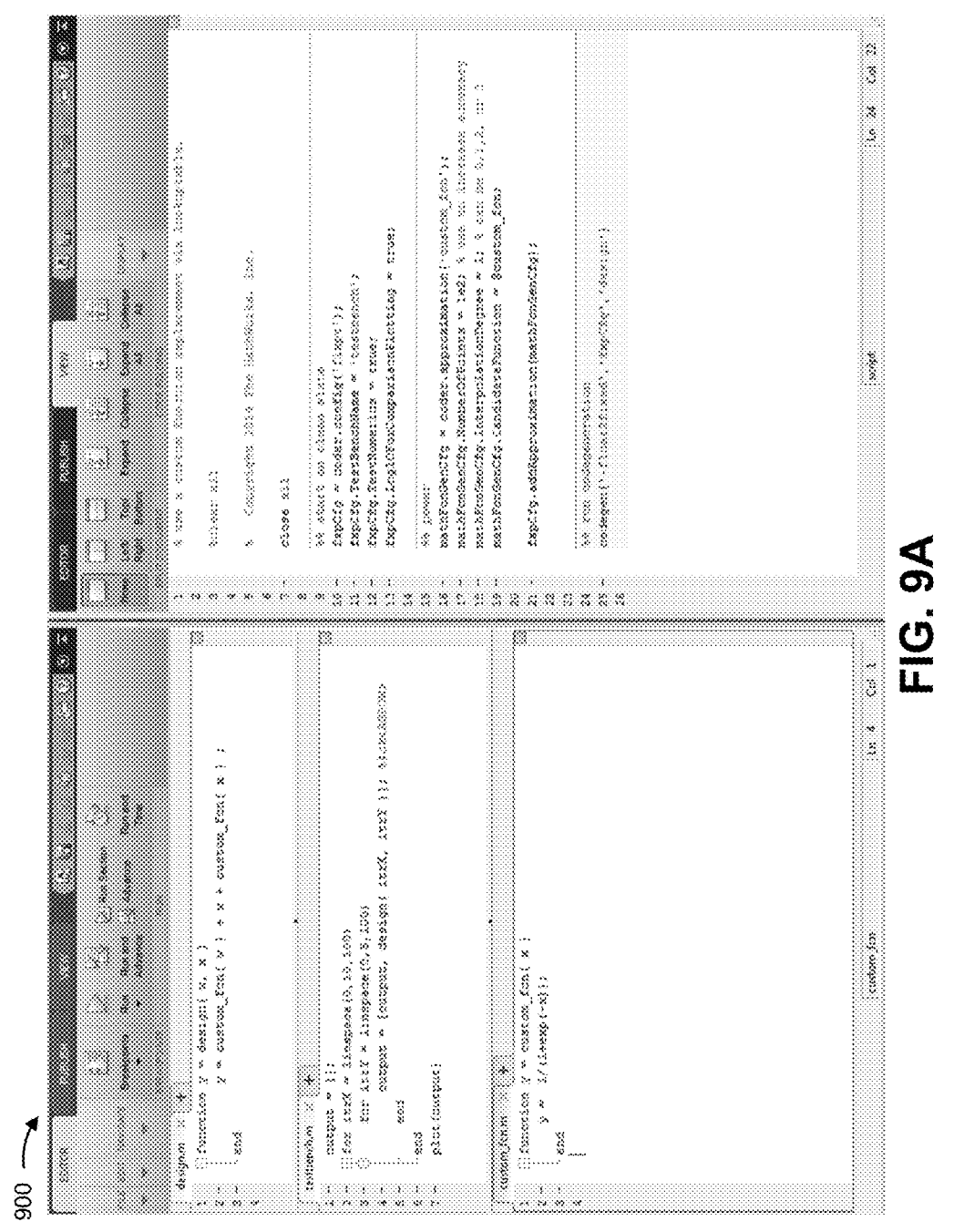
Figure 9B:
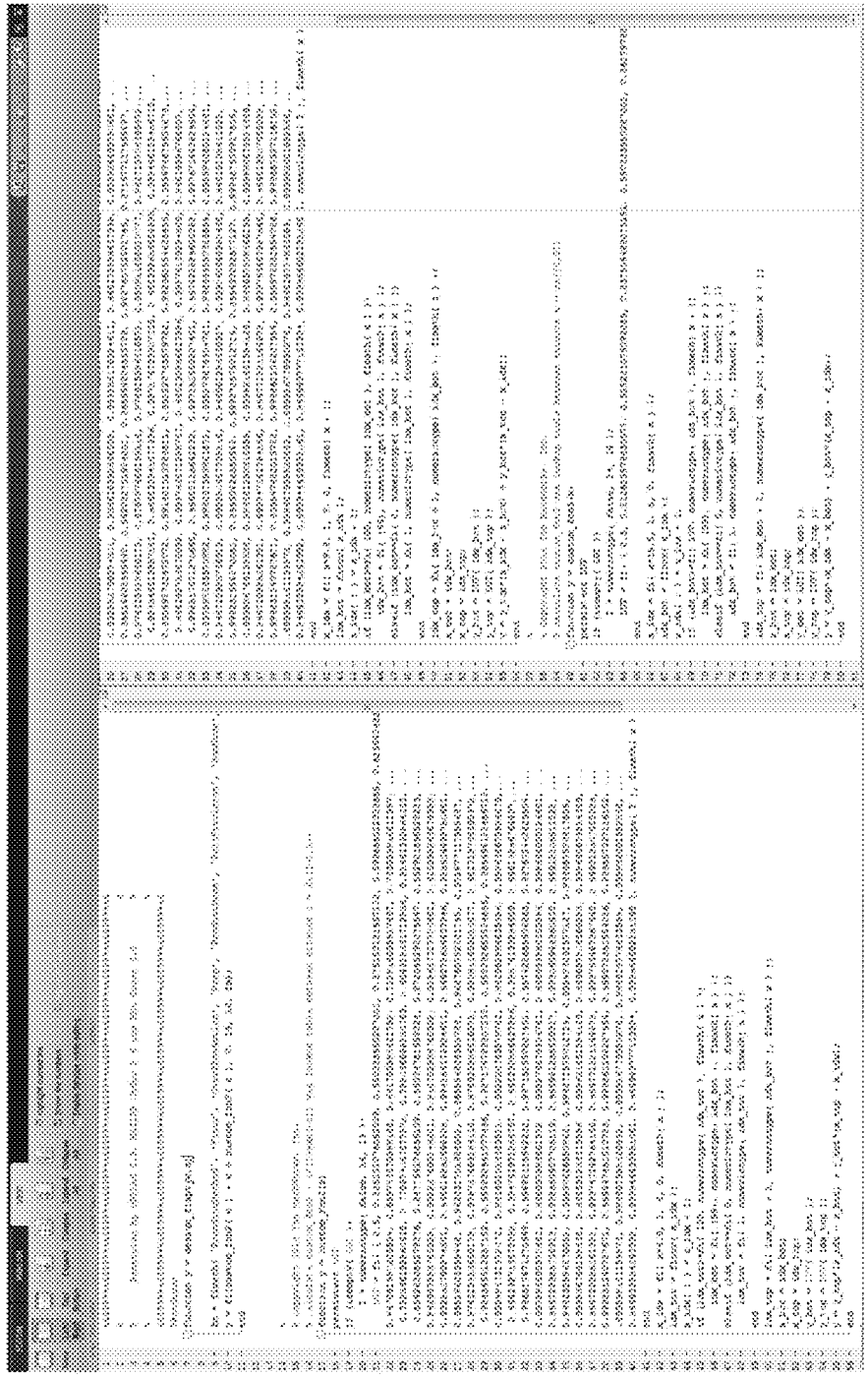

FIGS. 9A and 9B are diagrams of an example command line interface implementation 900 relating to example process 400 shown in FIG. 4. For purpose of example command line interface implementation 800, assume that a user has provided a design (e.g., design.m) that includes a custom function (e.g., defined in a custom_fcn.m file), y=1/(1+exp (-x)). Further, assume that the user has defined a testbench script (e.g., testbench.m) to be used to evaluate the function. Finally, assume that the user wishes to create a replacement construct for the custom function in the form of a lookup table (e.g., such that the user may create fixed-point program code, associated with the design, based on the lookup table).

As shown in FIG. 9A, the user may provide, via a command line interface of a TCE, a set of commands associated with generating a replacement construct. For example, the user may create a fixed-point configuration object (e.g., fxpCfg=coder.config ('fixpt'), may specify the test bench associated with the fixed-point configuration object (e.g., fxpCfg=TestBenchName='testbench'), and may provide other commands associated with the configuration object (e.g., a command to enable numerics testing, a command to enable data logging, etc.).

As further shown, the user may create an approximation object, associated with generating the lookup table (e.g., mathFcnGenCfg=coder.approximation ('custom_fcn')), may specify a parameter indicating that 100 points are to be used in the lookup table (e.g., mathFcnGenCfg.NumberOfPoints=1e2), may specify a parameter indicating that a linear interpolation is to be used for the lookup table (e.g., mathFcnGenCfg.InterpolationDegree=1), and may identify that the lookup table is to be based on the custom function (e.g., mathFcnGenCfg.CandidateFunction=(@custom_fcn). Finally, as shown, the user may provide a command indicating that the TCE is to generate the lookup table based on the fixed-point configuration object and the design including the custom function (e.g., codegen('-float2fixed', 'fxpCfg','design').

As shown in FIG. 9B, the TCE may evaluate the custom function and may generate the lookup table associated with the custom function (e.g., based on the parameters provided by the user). As further shown, the TCE may replace the program code, associated with the custom function, with program code associated with the lookup table. The user may then generate fixed-point program code based on the program code associated with the lookup table.

As indicated above, FIGS. 9A and 9B are provided merely as an example. Other examples are possible and may differ from what was described with regard to FIGS. 9A and 9B.

Implementations described herein may allow a user device to generate a replacement construct based on a floating-point function. In this way, fixed-point program code, associated with the floating-point function, may be generated based on the replacement construct (e.g., rather than the floating-point function).

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc.

In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive information associated with a floating-point function,
the floating-point function being a function described in a programming language that uses a floating-point representation;
identify the floating-point function;
determine, prior to generating fixed-point code for the floating-point function and based on identifying the floating-point function, that directly converting the floating-point function to a fixed-point function is not supported;
determine, based on the directly converting not being supported that the floating-point function is to be replaced with a replacement construct,
the replacement construct including one of:
a lookup table,
a coordinate rotation digital computer construct,
a Newton-Raphson construct,
a Taylor series construct, or
a numerical approximant construct,
the replacement construct being described in the programming language, and
the replacement construct including a floating-point approximation, of the floating-point function, that is used in a conversion from the floating-point representation to a fixed-point representation;
determine parameters associated with generating the replacement construct,
at least one parameter of the parameters being determined based on an evaluation of the floating-point function;
generate, after the parameters are determined, the replacement construct based on the parameters;
replace the floating-point function with the replacement construct;
perform the conversion from the floating-point representation to the fixed-point representation based on the floating-point approximation; and
generate fixed-point program code based on the conversion.

2. The device of claim 1, where the floating-point function includes at least one of:
a trigonometric function;
a logarithmic function;
an elementary function;
a piecewise function;
a polynomial function; or
a custom function.

3. The device of claim 1, where the one or more processors are further to:
determine a range of input values associated with the floating-point function;
determine a range of output values associated with the floating-point function; and
determine the parameters associated with generating the replacement construct based on the range of input values and the range of output values.

4. The device of claim 1, where the parameters include at least one of:
a parameter associated with a quantity of values;
a parameter associated with an interpolation method; or
a parameter associated with an error threshold.

5. The device of claim 4, the interpolation method comprises determining values between two values included in the replacement construct.

6. The device of claim 1, where the replacement construct is generated based on a parameter associated with at least one of:
a lookup table architecture;
a coordinate rotation digital computer architecture;
a Newton-Raphson architecture;
a Taylor series architecture; or
a Padé approximant architecture.

7. The device of claim 1, where the one or more processors are further to:
determine information that identifies a recommended architecture to be used to generate the replacement construct; and
determine the parameters associated with generating the replacement construct based on the information that identifies the recommended architecture.

8. A computer-readable medium storing instructions, the instructions comprising:
one or more instructions that, when executed by one or more processors, cause the one or more processors to:
receive information associated with a floating-point function,
the floating-point function being a function described in a programming language that uses floating-point representation;
identify the floating-point function;
determine, prior to generating fixed-point code for the floating-point function and based on identifying the floating-point function, that directly converting the floating-point function to a fixed-point function is not supported;
determine, based on the directly converting not being supported that the information associated with the floating-point function is to be replaced with a replacement construct,
the replacement construct including one of:
a lookup table,
a coordinate rotation digital computer construct,
a Newton-Raphson construct,
a Taylor series construct, or
a numerical approximant construct,
the replacement construct being described in the programming language, and
the replacement construct including a floating-point approximation, of the floating-point function, that is used in a conversion from the floating-point representation to a fixed-point representation;
determine a set of parameters associated with creating the replacement construct,
the set of parameters being determined based on an evaluation of the floating-point function;
create, after the set of parameters are determined, the replacement construct based on the set of parameters;
replace the information associated with the floating-point function with the replacement construct;
perform the conversion from the floating-point representation to the fixed-point representation based on the floating-point approximation; and
generate fixed-point program code based on the conversion.

9. The computer-readable medium of claim 8, where the instructions further comprise:

one or more instructions that, when executed by the one or more processors, cause the one or more processors to:
  receive user input indicating that the information associated with the floating-point function is to be replaced; and
  determine that the information associated with the floating-point function is to be replaced based on the user input.

10. The computer-readable medium of claim 8, where the replacement construct is created based on a parameter, included in the set of parameters, associated with at least one of:
  a lookup table architecture;
  a coordinate rotation digital computer architecture; or
  a Newton-Raphson architecture;
  a Taylor series architecture; or
  a Padé approximant architecture.

11. The computer-readable medium of claim 8, where the set of parameters include at least one of:
  a parameter associated with a quantity of values;
  a parameter associated with an interpolation method; or
  a parameter associated with an error threshold.

12. The computer-readable medium of claim 8, where the instructions further comprise:
  one or more instructions that, when executed by the one or more processors, cause the one or more processors to:
    determine a target platform associated with the fixed-point program code from among a plurality of possible platforms before the replacement construct is generated.

13. The computer-readable medium of claim 8, where the set of parameters is a first set of parameters, the replacement construct is a first replacement construct, the first replacement construct is created using the first set of parameters, and the instructions further comprise:
  one or more instructions that, when executed by the one or more processors, cause the one or more processors to:
    determine a second set of parameters associated with creating a second replacement construct,
      the second set of parameters being different than the first set of parameters;
    create the second replacement construct based on the second set of parameters,
      the second replacement construct being different than the first replacement construct; and
    generate the fixed-point program code based on the second replacement construct.

14. The computer-readable medium of claim 8, where the set of parameters include one or more factors,
  the one or more factors including at least one of a compile time program analysis or a numerical analysis.

15. A method, comprising:
  receiving a floating-point function that is described in a programming language that uses floating-point representation,
    the receiving being performed by a device comprising a processor;
  determining, prior to generating fixed point code for the floating-point function, that directly converting the floating-point function to a fixed-point function is not supported,
    the determining that the directly converting is not supported being performed by the device;
  determining, based on the directly converting not being supported, that the floating-point function is to be replaced with a lookup table,
    the lookup table being described in the programming language,
    the lookup table including a floating-point approximation, of the floating-point function, that is used in a conversion from the floating-point representation to a fixed-point representation, and
    the determining that the floating-point function is to be replaced with the lookup table being performed by the device;
  determining parameters associated with generating the lookup table,
    at least one parameter of the parameters being determined based on evaluating the floating-point function, and
    the determining the parameters being performed by the device;
  generating, after the parameters are determined, the lookup table based on the parameters,
    the generating the lookup table being performed by the device;
  replacing the floating-point function with the lookup table,
    the replacing being performed by the device;
  performing the conversion from the floating-point representation to the fixed-point representation based on the floating-point approximation,
    the performing the conversion being performed by the device; and
  generating fixed-point program code based on the conversion,
    the generating the fixed-point program code being performed by the device.

16. The method of claim 15, where the floating-point function includes at least one of:
  a trigonometric function;
  a logarithmic function;
  an elementary function;
  a piecewise function;
  a polynomial function; or
  a custom function.

17. The method of claim 15, further comprising:
  determining, without user intervention, a range of input values based on evaluating the floating-point function; and
  performing a compile time program analysis or a numerical analysis based on the floating-point function.

18. The method of claim 15, further comprising:
  determining the parameters based on a speed optimization or an area optimization associated with the generating the lookup table.

19. The method of claim 15, further comprising:
  determining one or more computer architectures to be associated with the lookup table;
  providing for display information associated with the one or more computer architectures; and
  receiving a selection of a computer architecture, of the one or more computer architectures, to be used for the lookup table.

20. The method of claim 15, where the parameters include at least one of:
   a parameter associated with a quantity of values;
   a parameter associated with an interpolation method; or
   a parameter associated with an error threshold.

\* \* \* \* \*

UNITED STATES PATENT AND TRADEMARK OFFICE
CERTIFICATE OF CORRECTION

PATENT NO. : 10,168,990 B1  
APPLICATION NO. : 14/157821  
DATED : January 1, 2019  
INVENTOR(S) : Muthiah Annamalai et al.

Page 1 of 2

It is certified that error appears in the above-identified patent and that said Letters Patent is hereby corrected as shown below:

In the Specification

Column 3, Line 34 reads:  
loops of individual non-array operations. In addition. TCE  
Should read:  
loops of individual non-array operations. In addition, TCE Column 3, Line 56 reads:  
environment (e.g., Simulink® software, Stateflow® software.  
Should read:  
environment (e.g., Simulink® software, Stateflow® software, Column 10, Line 4 reads:  
one or more other types of parameter associated with  
Should read:  
one or more other types of parameters associated with Column 14, Line 48 reads:  
choose proceed with generating the HDL program code  
Should read:  
choose to proceed with generating the HDL program code Column 17, Line 27 reads:  
didateFunction = (@custom_fcn). Finally, as shown, the user  
Should read:  
didateFunction = @custom_fcn). Finally, as shown, the user Column 17, Line 60 reads:  
processing to execute (e.g., C++ code. Hardware Descrip- Signed and Sealed this  
Twenty-fifth Day of February, 2025

Coke Morgan Stewart  
*Acting Director of the United States Patent and Trademark Office*

Should read:
processing to execute (e.g., C++ code, Hardware Descrip-

Column 18, Line 28 reads:
similar terms). As used herein. "satisfying" a threshold (or
Should read:
similar terms). As used herein, "satisfying" a threshold (or In the Claims Claim 1:
Column 19, Line 18 reads:
supported that the floating-point function is to be
Should read:
supported, that the floating-point function is to be Claim 5:
Column 20, Line 1 reads:
5. The device of claim 4, the interpolation method com-
Should read:
5. The device of claim 4, where the interpolation method com-